(No Model.)
A. McGUIGGAN.
IMPLEMENT FOR HANDLING COILS OF WIRE.
No. 288,467. Patented Nov. 13, 1883.
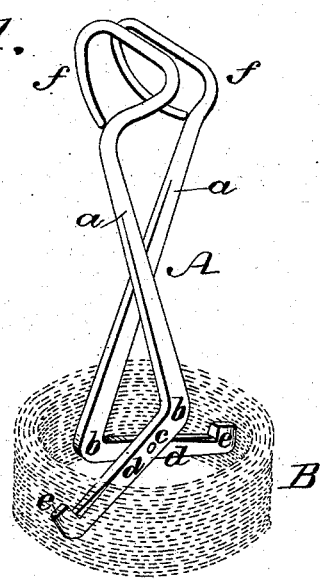
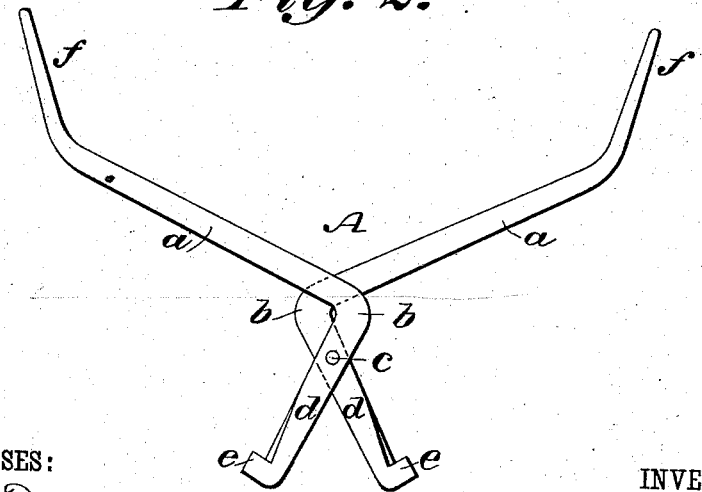
WITNESSES:
INVENTOR:
A. McGuiggan
BY Munn & Co
ATTORNEYS.

UNITED STATES PATENT OFFICE.

ANTHONY McGUIGGAN, OF DELAVAN, MINNESOTA.

IMPLEMENT FOR HANDLING COILS OF WIRE.

SPECIFICATION forming part of Letters Patent No. 288,467, dated November 13, 1883.

Application filed August 10, 1883. (No model.)

*To all whom it may concern:*

Be it known that I, ANTHONY McGUIGGAN, of Delavan, Faribault county, Minnesota, have invented a new and Improved Coiled-Wire Lifter, of which the following is a full, clear, and exact description.

The object of this invention is to provide a cheap and convenient device for handling coils of wire generally, but one more especially intended for lifting the coils or spools of barbed wire used for fencing purposes, thus avoiding the necessity of using the hands in direct contact with the wire, as is now the practice.

Reference is to be had to the accompanying drawings, forming part of this specification, in which similar letters of reference indicate corresponding parts in both the figures.

Figure 1 is a perspective view of my new and improved wire-handling implement, showing the manner of lifting a coil of wire; and Fig. 2 is a side elevation of the tool, showing the handles of the implement open, ready for engaging the lifting ends of the tool with the coil of wire to be moved.

A represents my new and improved implement for handling coils of wire, and B represents in dotted lines a coil of wire.

The implement A is composed of the members *a a*. These are duplicates of each other. They are each bent at *b* to form the lifting-arms *d d*, and are pivoted together, with the arms *d d* reaching in opposite direction, by the pivot *c*. The outer ends of the lifting-arms *d d* are formed with the upwardly-projecting lugs *e e*, that are adapted to engage with the coil of wire to be lifted, and the upper ends of the members *a a* are looped, as shown at *f f*, to form the handles of the implement.

In using the implement, the members *a a* are first to be opened out—that is, the upper ends or handles, *f f*, thereof are to be moved away from each other to the position shown in Fig. 2, which will bring the lifting-arms *d d* close together, as shown in said figure, so that they may be passed down through the center of a coil of wire. The arms *d d* will then be passed down through the center of the coil or spool of wire to be lifted, and then the upper ends of the members *a a* will be drawn together, which will open out the arms *d d*, and cause them to reach out under the coil of wire, or to engage the bends *b* with the inner surface of the coil, thus securely locking the implement with the coil, so that upon lifting the implement by the handles *f f* (which may be done with one hand) the coil of wire may be moved without touching the coil with the hands. The crooks *b*, at some distance from the pivot-pin *c*, have the peculiar effect, in connection with the hook ends *e*, of giving each member two bearings on the coil. The bind *b* is caused to bear within the coil by the act of hooking the same member beneath the coil when lifted by its own handle or by both handles.

I am aware that a lifter provided with end hooks similar to my hooks *e* is shown in Patent No. 264,547, and that I do not claim, broadly; but

What I claim as my invention, and wish to secure by Letters Patent, is—

Two bars, each shaped into a handle at one end, and a hook at the other end, bent nearly at a right angle at a point some distance from the hook end, the two pivoted together at a point between the hook ends and said right-angular bends, forming a wire-lifter, substantially as described.

ANTHONY McGUIGGAN.

Witnesses:
C. S. ABBOTT,
W. F. COX.